April 9, 1963 D. A. BROSSEAU ET AL 3,085,178

SWITCHING APPARATUS

Filed Dec. 24, 1958

3 Sheets-Sheet 1

INVENTORS
DON A. BROSSEAU AND
BY WILLIAM C. KEERAN

Mason, Kolehmainen, Rathburn and Wyss
ATTORNEYS.

INVENTORS
DON A. BROSSEAU AND
WILLIAM C. KEERAN
BY
Mason, Kolehmainen, Rathburn and Wyss
ATTORNEYS.

INVENTORS.
DON A. BROSSEAU AND
BY WILLIAM C. KEERAN
Mason, Kolehmainen, Rathburn and Wyss
ATTORNEYS.

3,085,178
SWITCHING APPARATUS

Don A. Brosseau, Chicago, and William C. Keeran, Evanston, Ill., assignors, by mesne assignments, to Vapor Corporation, Chicago, Ill., a corporation of Delaware Filed Dec. 24, 1958, Ser. No. 782,823
25 Claims. (Cl. 317—124)

The present invention relates to switching apparatus, and more particularly to a device for switching high currents operated in response to changes in a low level electrical characteristic such as current or voltage, thus providing in a single device the functions usually performed by the combination of a sensitive low current actuated switching device which in turn operates a high current switching device. More particularly, the present invention relates to a high current switching device and circuit that is actuated by a low level variable electrical characteristic that falls below or rises above a predetermined level.

There are numerous electrical characteristics of low level which it is desired to use to actuate a control device. One example is the low current passing through a light responsive device whose conductivity varies in dependence upon the ambient light. Another example is the low current passing through a temperature responsive device whose conductivity varies in relation to the ambient temperature. Still another example would be the low current passing through a pressure responsive device such as a carbon pile whose conductivity varies in dependence upon the pressure applied to it. Still another example might be a switching device which switches on and off a low level current. Often the change in ambient light, temperature or pressure is very gradual, which means that the change in an electrical characteristic of the light, temperature or pressure sensitive element used to perform a control function is also very gradual.

Regardless of how the low level electrical characteristic is produced to actuate a high current switching device, it may be desirable to include a delay means in the switching apparatus to prevent the actuation of the high current switching device immediately upon the attainment of a predetermined level of the low level electrical characteristic. For example, where the switching apparatus is used to control lights such as street lights, lights on outdoor advertising signs or lights for parking lots in response to the ambient illumination level, if such a delay means were not included, the lights might be temporarily turned Off by lightning flashes, automobile headlight flashes or similar momentary lighting, whereas the lights should remain On.

Switching apparatus of the type mentioned above would have application in situations where it would be desirable to override the effect of the low level electrical characteristic which actuates the switching device. For example, in the lighting field it may be desirable to turn off lights even though a light responsive device requires the switching apparatus to turn on the lights. Installations of this type would be desirable with outdoor advertising signs or parking lots where lighting may be desired from dusk until some predetermined time such as midnight, but because of diminished traffic no lighting is desired from a predetermined time such as midnight until dusk on the following day. The present invention is particularly adaptable for association with clock timing means to override the effect of the low level electrical characteristic used to actuate the switching means.

Although the present invention is equally applicable for use where the low level electrical characteristic for actuating the device may be produced in any manner, the invention is described hereinafter particularly in connection with light responsive control means. It should be understood, however, that pressure responsive, temperature responsive or any other similar device might equally well be employed. Light responsive switching apparatus have been used extensively in connection with street lighting systems, billboards and advertising lighting, flood lighting, warning lights and the like. Where the present invention is used in connection with illumination control means, it would be desirable to provide means for automatically turning on such lights whenever illumination is needed at a selected predetermined degree of darkness regardless of the particular time of day, which control means will also automatically turn off or otherwise render ineffective the illumination when it is not needed. One light responsive switching device is disclosed in copending Keeran application Serial No. 782,907, filed concurrently herewith and assigned to the same assignee as the present application. In such a device a light sensitive element controls an electromagnetic switch or relay for performing a switching operation. The light sensitive element is one that controls a low level electrical characteristic. Moreover, the change in ambient light is very gradual both as darkness approaches and again as daylight approaches. This means that the change in electrical characteristic controlled by the light sensitive element used to perform a control function is also very gradual. Such a gradual change of a low level electrical characteristic, which might be a change in current or a change in voltage, is not the best type of condition change for uniform and satisfactory control of switching apparatus such as a high current electromagnetic switching apparatus. This is because the armature of such electromagnetic switching apparatus, particularly when energized with alternating current, tends to chatter before pulling in, and other undesirable conditions occur. Because of the low level of the electrical characteristic such as the current produced for example by a device such as a light sensitive cell, a very low magnetic flux is produced by the winding of any electromagnet carrying the current of the low level actuating device such as the light sensitive cell. This magnetic flux might be sufficient to move a very light armature, but it is insufficient to move an armature of the type necessary to control high current carrying switching means. To avoid chattering, electromagnetic devices have been designed wherein the armature moves toward a fixed magnetic element, which might be referred to as a stator. Thus, any movement of the armature as the current through the electromagnetic winding increases will tend to decrease the reluctance of the path very rapidly and, hence, rapidly increase the magnetic force on the armature. Thus, in addition to the problem of moving only a light armature, such devices, although insuring rapid pull-in of the armature, have the problem of the armature striking the magnetic member or stator and bouncing away from it with sufficient force to return to the dropped out position. This armature will, of course, again be pulled into engagement with the stator, but since the low level electrical characteristic which controls the energization of the electromagnetic device changes so slowly, a substantial time may elapse before the second pull-in occurs. It is important that foolproof operation be insured.

Accordingly, it is an object of the present invention to provide a new and improved switching apparatus operated in response to changes in a variable low level electrical characteristic.

It is another object of the present invention to provide a new and improved switching apparatus for switching high current loads in a foolproof manner in response to a low level variable electrical characteristic that falls below or rises above a predetermined level.

It is another object of the present invention to provide a bounce suppression means for a fast-acting electromagnetic relay.

A further object of the present invention resides in an improved electromagnetic relay for controlling high current loads while being actuated in response to a low level electrical characteristic which changes very gradually without being adversely affected by momentary rapid changes of the electrical characteristic.

Still another object of the present invention resides in switching apparatus wherein a high current switching function may be performed in accordance with changes in a low level electrical characteristic and in which timing means are provided to override the control of the low level electrical characteristic under certain conditions.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Briefly, the present invention is concerned with an electromagnetic switching device which may be incorporated in a sealed housing of the type disclosed and claimed in the aforesaid Keeran application. The electromagnetic switching device is designed to control a high current load, and its switching operation is intended to be initiated by the changes in a low level variable electrical characteristic. In order that this may be satisfactorily accomplished, the electromagnetic switching apparatus does not include a single armature but, instead, includes two armatures, a main or principal armature and an auxiliary or pilot armature, both of which are under control of a single winding of the electromagnetic switching device. The pilot armature is light in weight and when it is actuated it closes a circuit which supplies a sufficient current to the winding of the electromagnet to insure foolproof operation of the principal armature. In another embodiment of the present invention time delay means are included which delay the application of a higher current to the electromagnet in response to movement of the pilot armature; and in still another modification time control means are incorporated to override the control provided by the means producing the low level variable electrical characteristic. The various embodiments may also be housed in sealed disposable units.

As was mentioned above, although the low level variable electrical characteristic may be produced by many different devices such as light responsive, temperature responsive or pressure responsive devices, the particular device producing the low level electrical characteristic forms no part of the present invention. In order, however, fully to describe the present invention, a light sensitive element or photocell has been chosen as the representative device for producing the low level variable characteristic. This, however, is by way of example only.

Figure 1:
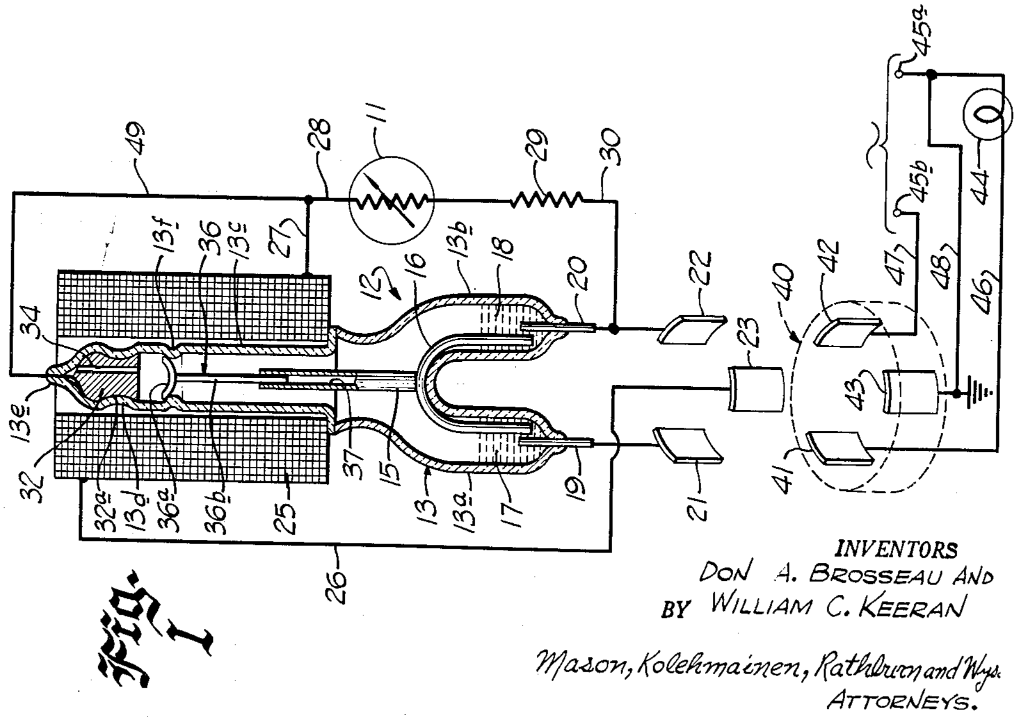
FIG. 1 is a somewhat schematic diagram of switching apparatus embodying the present invention.

Referring now to FIG. 1, there has been illustrated switching apparatus comprising a switch actuator generally designated at 11, which in the case of an illumination control device would comprise a light sensitive cell. The switching apparatus of the present invention also includes an electromagnetically controlled switching device or relay 12.

The actuator 11 has been schematically designated as a variable electrical resistance, and in the event that it were a light sensitive element it would comprise a photoconductive cell whose electrical conductance changes with illumination. The low level variable electrical characteristic in the case of a photoconductive cell would be current, but the electrical characteristic might also be voltage or, in some cases, something even different such as frequency or the like. In the copending Keeran application referred to above there is disclosed light control apparatus in which a light sensitive element of the photoconductive type was employed. Photoconductive type light sensitive elements generally employ a chemical element which lies in the borderland between conductors and insulators. As the light imposed upon the chemical element increases in intensity, the resistance thereof decreases, thus permitting more current to flow through the light sensitive cell which is connected in circuit across a suitable source of voltage.

Considering now the electromagnetically controlled switching device 12, it has been illustrated as a mercury switch of the type shown in the copending Keeran application referred to above. As illlustrated, this switch comprises a sealed envelope 13 in the form of an inverted Y with a pair of hollow diverging legs 13*a* and 13*b* connected to an upwardly extending and vertically disposed hollow leg 13*c*. A reciprocating main or principal armature 15 extends into the leg 13*c* of the envelope 13, and is more or less disposed with its longitudinal axis coincident with the longitudinal axis of the leg 13*c*. As illustrated, the principal armature 15 is connected to a U-shaped bridging contact 16 which, with the armature 15, is normally adapted under the force of gravity to move to the lowermost position indicated in FIG. 1 of the drawings where the legs of the U-shaped bridging member 16 extend into two mercury pools 17 and 18 which are disposed in the hollow legs 13*a* and 13*b* of the sealed envelope 13. The envelope 13 may be evacuated or it may be filled with a suitable inert atmosphere such as nitrogen or the like.

Upward movement of the bridging contact 16 will interrupt the circuit through the mercury pools 17 and 18. Electrical connection to the two mercury pools is made by suitable terminals 19 and 20, each having one end thereof extending into the associated mercury pool 17 or 18 as the case may be, and the other ends thereof extending outside the envelope 13. If the envelope 13 is formed of glass, suitable glass-to-metal seals are employed where the terminals 19 and 20 enter the envelope 13. As illustrated in FIG. 1 of the drawings, the terminals 19 and 20 are connected to suitable terminals 21 and 22 which may comprise two of the terminals of the conventional twist type connector whereby electrical connection with associated apparatus may be made. A third terminal of such a connector designated as 23 is preferably also included and its function will become apparent from the ensuing description.

In order to actuate the armature or electromagnetic plunger 15 within the sealed envelope 13, there is provided a solenoid winding 25 surrounding the leg 13*c* of the envelope 13. So that the winding 25 may be energized in response to a low level electrical characteristic produced by the actuator 11, it is connected in series with the element or actuator 11 across a suitable source of power. As illustrated, one terminal of the winding 25 is connected by a suitable conductor 26 with the terminal 23. The other terminal of the winding 25 is connected by conductors 27 and 28 to one terminal of the actuator 11, and then through a suitable matching resistor 29 and a conductor 30 with the terminal 22. If the terminals 22 and 23 are connected across a source of electrical energy, a current will flow in series through the winding 25 and actuator 11 in dependence upon the electrical impedance introduced into the circuit by virtue of the actuator 11. Thus, if actuator 11 is a light sensitive element of the photoconductive type, a higher current will flow through winding 25 under conditions of high illumination and very low currents will flow as the level of illumination decreases.

With the arrangement described thus far, it will be apparent that where actuator 11 is a light sensitive cell of the photoconductive type, a very gradual increase in current in the winding 25 will occur as daylight approaches, and this current generally is so small that it would not insure positive and foolproof movement of the principal armature 15 and, consequently, the bridging contact 16 to interrupt the circuit at the terminals 21 and 22. In accordance with the present invention and to insure foolproof operation, there is mounted within the upper end of the sealed leg **13*c* a stationary magnetic member 32 which might be considered as a sort of stator. In order to secure the magnetic member 32 within the leg 13*c* in fixed position, this member 32 preferably is provided with a circumferential groove 32*a*, and the envelope 13 which may be formed of glass or the like is preferably deformed as indicated at 13*d* to be received within the groove 32*a* in the magnetic member 32. This firmly secures the magnetic member in position. Obviously, other means for supporting the magnetic member 32 in fixed position may be employed. As illustrated, the magnetic member 32 is provided with a passageway 34 therethrough, through which the envelope 13 may be evacuated as well as supplied with mercury and, if desired, filled with an inert atmosphere, after which the envelope 13 may be sealed off as indicated at 13*e***.

The presence of the stator 32 means that as armature 15 moves upwardly the distance between the stator 32 and the armature 15 decreases and a rapid decrease of the reluctance of the flux path occurs, so that once upward movement of the armature 15 starts, positive continuous movement to the uppermost position is insured. Unfortunately, when the armature 15 approaches the stator 32, the magnetic force applied thereto rapidly increases with a rapid increase in the speed of movement thereof so that upon striking the stator 32 it has been found that it is sometimes caused to bounce away and return to the initial position shown in FIG. 1 of the drawings. This bouncing action could cause opening and closing of the circuit which is being controlled and would be completely unacceptable. Additionally, due to the very gradual change in the electrical characteristic by virtue of the actuator 11, the electromagnetically controlled device 12 might not immediately pick up a second time, but some delay might be occasioned. In any event, it is essential that such bouncing action be completely eliminated.

In accordance with the present invention there is provided an auxiliary or pilot armature 36 which comprises a somewhat U-shaped magnetic member **36*a* secured to a slender elongated rod 36*b* preferably formed of electrically conducting but non-magnetic material. In a device built in accordance with the present invention, the portion 36*b* was formed of stainless steel, and the portion 36*a* of auxiliary armature 36 was formed of magnet steel, preferably platinum plated. Similarly, the stator 32 is preferably platinum plated. Also in accordance with the present invention, the armature 15 is of tubular configuration so as to provide a central opening or passageway 37 open at the upper end to receive the extension 36*b* of the pilot or auxiliary armature 36**.

As illustrated in FIG. 1 of the drawings, the armature 15 has a lowermost or closed switch position which is determined by engagement of the bridging member 16 with the walls defining the sealed envelope 13. In order to limit the lowermost position of the auxiliary or pilot armature 36, the leg **13*c* of the sealed envelope 13 is preferably provided with a deformation 13*f* defining an annular ledge as clearly indicated in FIG. 1 of the drawings. Thus, the somewhat U-shaped portion 36*a* of the pilot armature 36 is spaced only a fixed predetermined distance from the stator 32 when the winding 25 is unenergized. The bore or passageway 37 within the armature 15 is substantially larger than the outer diameter of the extension 36*b* of the pilot armature 36 so that free relative movement between the principal armature 15 and the pilot armature 36 can occur. For a purpose which will become apparent from the following description, however, it is desired to maintain electrical connection between the pilot armature 36 and the principal armature 15. This is accomplished by virtue of the fact that the principal armature 15 tends to tip to one side or the other within the sealed envelope 13, and this tipping action is limited by the extension 36*b*. Thus, electrical connection between the two armatures is assured at all times. When a current of a predetermined relatively high magnitude flows through the winding 25 both the pilot armature 36 and the principal armature 15 move upwardly as viewed in FIG. 1 of the drawings. The uppermost position of pilot armature 36 is determined by engagement with the stator 32, while the uppermost position of the principal armature 15 is limited by engagement with the portion 36*a* of the pilot armature 36 when in its uppermost position. In this energized or picked up position of the principal armature 15, the uppermost portion thereof should be slightly above the center of the winding 25**.

Considering the electrical circuit in more detail, the terminals 21, 22 and 23, as mentioned above, preferably comprise a convention three-terminal plug receivable in a suitable corresponding three-receptacle connector 40. As shown in FIG. 1, the connector 40 includes three cooperating terminals 41, 42 and 43 which are adapted to make electrical connection with the terminals 21, 22 and 23, respectively. The electrical circuit with the three-receptacle connector 40 is schematically illustrated in FIG. 1 of the drawings. As there illustrated, a lighting load schematically indicated at 44 is connected between the terminal 41 and one terminal **45*a* of an alternating current source by a conductor 46. The terminal 42 is illustrated as being connected by a conductor 47 with another terminal 45*b* of an alternating current source. The terminal 45*a* is also connected to the terminal 43 of the three-receptacle connector 40 by a conductor 48. When the bridging contact 16 is in the mercury pools 17 and 18, and the terminals 21, 22 and 23 are in electrical engagement with the corresponding terminals 41, 42 and 43 in the connector receptacle 40, the load 44 is energized. Conversely, when the bridging contact 16 is raised out of the mercury pools 17 and 18, the circuit through the high current load 44** is de-energized.

The control circuit for the winding 25 in addition to that already described comprises an auxiliary energization circuit comprising a conductor 49 one end of which is connected through the conductor 27 to one terminal of the winding 25, while the other end thereof is connected to the stator 32. In an embodiment built in accordance with the present invention, the upper end of the stator was provided with a saw slot into which the end of the conductor 49 was placed, and by deforming the stator adjacent the saw slot good electrical connection was completed. Obviously, the conductor 49 is connected through a suitable glass-to-metal seal in envelope 13 to the stator 32 if envelope 13 is formed of glass. With the arrangement described thus far a constant source of potential is applied between the terminals 22 and 23 through the series connected winding 25, actuator 11 and matching resistor 29. The resistor 29 has such a magnitude of resistance as to make sure that the load on the actuator 11 is not excessive regardless of the conditions producing the variable low level electrical characteristic in actuator 11. If desired suitable voltage limiting means may be connected across actuator 11 which might comprise neon lights or similar devices.

The circuit components in the position indicated in FIG. 1 of the drawings are representative of what would be true if darkness existed and actuator 11 were a light sensitive element of the photoconductive type. Under this condition the electromagnet 12 would be de-energized and the lighting load 44 energized. As the intensity of the light impinging on the actuator 11 increases as morning approaches, the current in the winding 25 gradually increases to a first predetermined relatively low magnitude whereby the magnetic force is sufficient to move the auxiliary armature 36 into engagement with the stator 32. This force, however, is not sufficient to pick up the armature 15 and associated bridging contact 16, although it would be sufficient to hold armature 15 in its raised position once it was picked up. In order that the principal armature 15 and associated bridging contact 16 may be actuated immediately following a pickup of the auxiliary or pilot armature 36, the auxiliary circuit comprising the conductor 49 is provided, and when pilot armature 36 moves into engagement with stator 32 an electrical circuit is completed from the terminal 22, bridging contact 16, principal armature 15, pilot armature 36, stator 32, conductor 49, conductor 27, winding 25, conductor 26 to terminal 23. This means that the full voltage of the source across terminals 45*a* and 45*b* is applied across this auxiliary circuit including the winding 25, thus insuring immediate upward movement of principal armature 15. Such upward movement of armature 15 interrupts the auxiliary circuit just described through the conductor 49, but the current through the actuator 11 is such as to hold the armature in the picked up position, and until the level of the current flowing through actuator 11 again decreases the load 44 will remain de-energized.

When the winding 25 is fully energized so that pilot armature 36 and main armature 15 are in their picked up positions, the main and pilot armature will effectively be a single unit. Under these conditions the circuit through bridging contact 16 is interrupted. Even though the auxiliary circuit for applying full energization to the winding 25 is interrupted, there will be no problem in holding the main armature 15 in its uppermost position. As the ambient light level increases in the event that actuator 11 is a light sensitive element, the current through the winding 25 will also increase until a maximum is reached, and then as the ambient level decreases with the approach of evening the current in winding 25 will decrease. At a predetermined low current level determined by a selected ambient light condition which may be adjusted by the adjustment of the matching resistor 29, the current in winding 25 is reduced sufficiently so that the armatures 15 and 36 are simultaneously released, with the result that the bridging contact 16 again closes the circuit for the lighting load 44. As far as the magnetic effect is concerned, when armatures 15 and 36 are in their uppermost positions, they are in effect a single unit and the magnetic attraction between armatures 15 and 36 is greater than the magnetic attraction between stator 32 and the two armatures. Thus, the two armatures will drop out as a single unit. However, upon increase in current through the winding 25 as actuator 11 permits more current to flow, the pilot armature 36 will operate first. The holding current for both armatures 15 and 36 is appreciably less than the pull-in current for the pilot armature 36, so that once the two armatures have dropped out the pilot armature will not be picked up again until a substantial increase in the current through actuator 11 occurs.

In view of the detailed description included above, the operation of the arrangement disclosed in FIG. 1 will be readily understood by those skilled in the art. When the low level electrical characteristic is such as to cause pilot armature 36 to move into engagement with stator 32, then a second energization circuit is completed for the winding 25 capable of supplying electrical current of much greater amplitude than is supplied through actuator 11.

Figure 2:
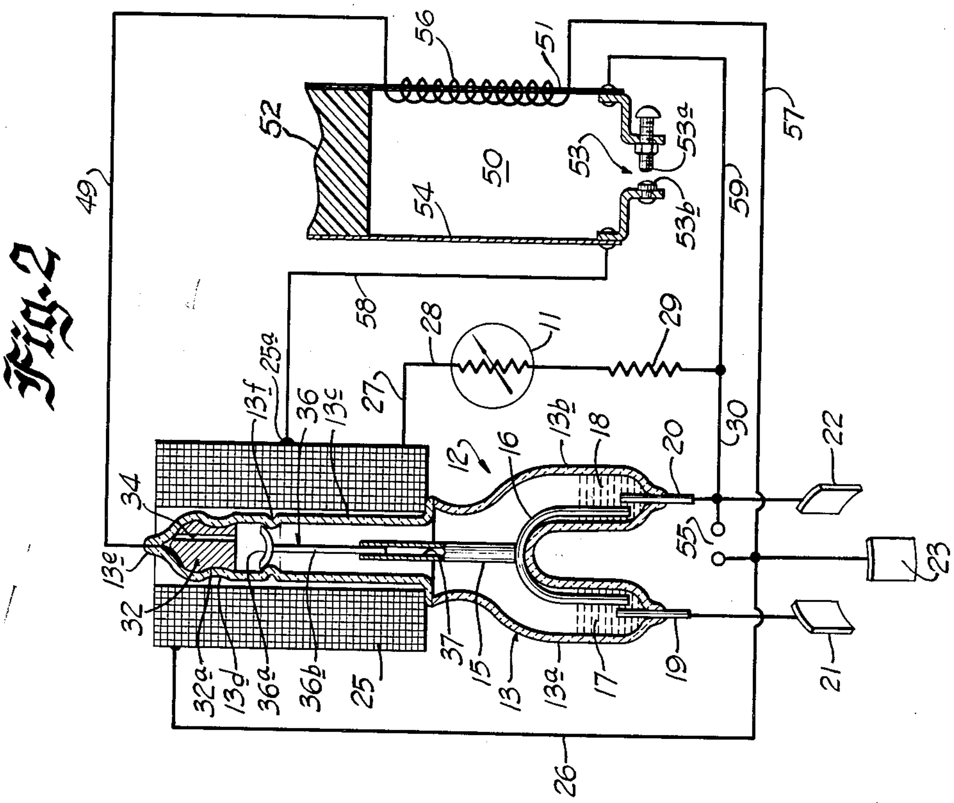
FIG. 2 is a schematic diagram similar to FIG. 1 illustrating a modification of the present invention wherein delay means are incorporated therein.

If the circuit arrangement of FIG. 1 is employed to control a lighting load and the actuator 11 is a light sensitive element, improper operation might result due to light sensitive element 11 being subjected to lightning flashes, automobile headlights or the like. In FIG. 2 of the drawings there is illustrated an application of the present invention where delay means are employed to insure proper operation even though the actuator 11 is subjected to momentary conditions which should not cause operation of the switching apparatus such as the electro-magnetic switch 12.

The corresponding parts of FIG. 2 are designated by the same reference numerals as in FIG. 1. As there illustrated, in addition to the elements described in FIG. 1 there is included a delaying means generally designated by the reference numeral 50 connected in parallel with the actuator 11. As illustrated, the delaying means comprises a bimetallic element 51 having one end thereof secured to a suitable insulating support 52. The free end of the bimetallic element is designated as supporting an adjustable contact 53*a* which might be designated as a movable contact. As illustrated, contact 53*a* is one contact of a normally open switch 53 comprising in addition to contact 53*a* a stationary contact 53*b*. Contact 53*b* is illustrated as being connected to a suitable support 54 also mounted on insulating support 52. Associated with the bimetallic element 51 is a suitable heater winding 56 which is schematically indicated as being wound around an intermediate portion of the bimetallic element. One terminal of the heater winding is connected to the end of conductor 49, which in FIG. 1 was connected to conductor 27. The other end of the heater winding 56 is connected through a conductor 57 to the terminal 23. The contact 53*b* of the switch 53 is indicated as connected by a conductor 58 to an intermediate top 25*a* on winding 25, while the contact 53*a* is indicated as being connected by a conductor 59 to the conductor 30 and, hence, to the terminal 22. Bimetallic element 51 is designed so that upon heating thereof contact 53*a* moves to the left as viewed in FIG. 2 of the drawings to close the contact of switch 53. The switching apparatus of FIG. 2 including the delaying means 50 functions in substantially the same way as the arrangement disclosed in FIG. 1 of the drawings. If actuator 11 is a light sensitive cell and it is gradually becoming daylight, the current flowing through actuator 11 and winding 25 will gradually increase until pilot armature 36 moves into engagement with stator 32. This completes the auxiliary circuit through conductor 49, but in the case of FIG. 2, unlike FIG. 1, the auxiliary energization circuit for the winding 25 is not immediately completed but, instead, a circuit through heater winding 56 is completed. After a predetermined time delay sufficiently long to eliminate improper operation due to momentary external conditions, such as in the case of a lighting circuit, the occurrence of lightning flashes or the like, switch 53 will be closed and then the main armature 15 will be actuated in exactly the same way as in FIG. 1 of the drawings. Thus, FIG. 2 differs from FIG. 1 in only two respects, i.e., delaying means 50 is included to delay the pickup of main armature 15 after pilot armature 36 has been picked up for a brief time to eliminate false operation by virtue of the occurrence of certain momentary extraneous conditions, and the conductor 58 is connected to an intermediate top 25*a* on winding 25 which increases the current which may flow and insures foolproof operation even though the source voltage is lower than normal. It should be understood that the higher current flow through winding 25 in FIG. 1 or a portion thereof as in FIG. 2 of the drawings is only for a brief instant of time. If pilot armature 36 should pick up and then drop out a few successive times, no adverse effect would occur with respect to the load circuit being controlled by the high current switching apparatus, since until the heater circuit for heater 56 is energized for a sufficiently long period of time the main armature 15 would not be actuated. With the U-shaped construction of portion 36*a* of pilot armature 36, however, no bouncing whatever occurs.

Figures 3, 4, 5:
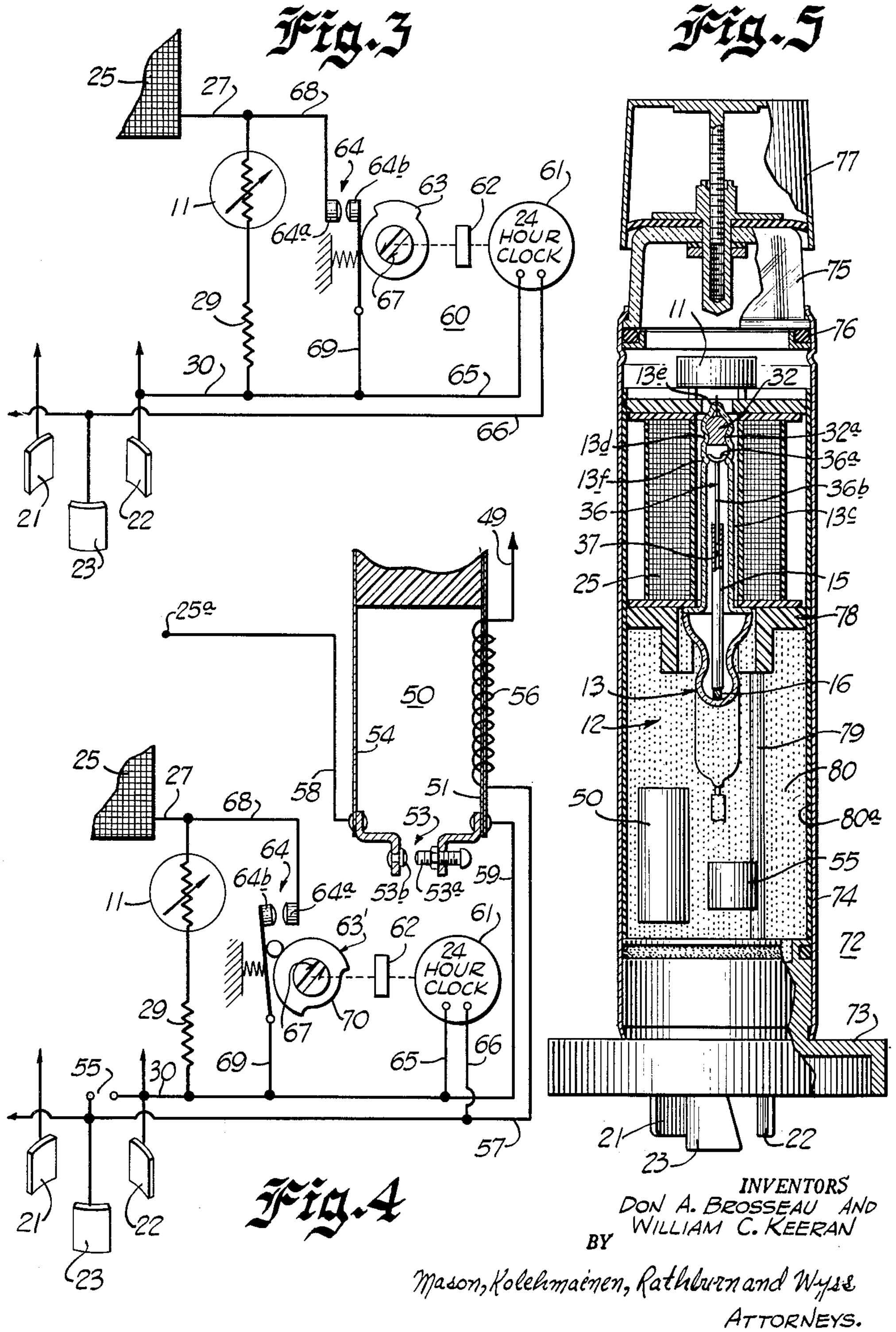
FIG. 3 is a schematic diagram similar to FIG. 1 showing the incorporation of a timing means with the switching apparatus of FIG. 1, only a portion of FIG. 1 being shown.
FIG. 4 is a schematic diagram showing the incorporation of timing means with the switching apparatus of FIG. 2, only a portion of FIG. 2 being shown.
FIG. 5 is a sectional elevational view illustrating one form of structure which the apparatus of FIG. 2 may take.

If it is desired to compensate the switching apparatus of FIG. 2 with respect to temperature, the support 54 might also be a bimetallic element identical with the bimetallic element 51 so as to deflect in the same direction with temperature as the element 51. Such an arrangement is disclosed in the copending Keeran application referred to above. Actually, if support 54 were also a bimetallic element, the operation would be the same, the temperature compensation merely changing the magnitude of the delay. In a device built in accordance with the present invention, the time delay device 50 comprised a small ceramic resistor of the order of one inch in length and about the thickness of an ordinary pencil. Mounted within this resistor was the bimetallic element 51 and the switch 53, thus providing a very compact construction. Such an arrangement is indicated in FIG. 5 of the drawings.

If the device of FIG. 1 or FIG. 2 is supported in an elevated position, which would be the case in connection with illumination control devices, it might be subject to lightning and a suitable lightning arrester indicated at 55 connected across the circuit including the actuator 11 should be included.

Where it is desired to provide timing means for overriding the actuator 11, such timing means should preferably be connected in parallel with the actuator 11. In FIG. 3 of the drawings there is illustrated an embodiment of the present invention in which timing means have been added to the switching apparatus of FIG. 1. The corresponding elements of FIG. 3 are designated by the identical reference numerals as in FIG. 1 of the drawings. As there illustrated, there is added to the apparatus of FIG. 1 a timing apparatus generally designated at 60 comprising a twenty-four-hour clock 61, which is one that makes one revolution in twenty-four hours. This clock is illustrated as being connected through a slip clutch 62 to a cam 63, which cam actuates a normally open, snap-acting switch schematically illustrated as 64, having a fixed contact 64*a* and a movable contact 64*b*. The switch 64 is indicated as being connected by conductors 68 and 69 across the serially arranged actuator 11 and matching resistor 29. In order to energize the twenty-four-hour clock, it is illustrated as being connected across the terminals 22 and 23 by conductors 65 and 66, respectively, the conductor 65 being connected to the conductor 30. Thus, the load circuit 44 may be controlled by actuation of the pilot armature 36, followed by actuation of the main armature 15 or directly by closing the contacts of the cam actuated switch 64.

Preferably, the cam 63 is designed to keep the switch 64 closed for a fixed period of time, which might, for example, be six hours, after which the switch 64 is again opened. As illustrated, the cam 63 is provided with an indicator 67, which preferably is visible on the face of the clock 61 (see FIG. 7). By setting the indicator 67 to the time of day at which the operator happens to be adjusting the timing mechanism 60, the cam 63 may be caused to close switch 64 at midnight and open it a predetermined number of hours later. The timer means 60 would thus energize the winding 25 at midnight, thus preventing the actuator 11, which in this case would be a light sensitive element, from keeping the load circuit energized during that six-hour period. That period would be one in which the amount of traffic would be so low as not to justify keeping the lighting circuit energized. Obviously, the cam 63 can be designed to give any time span other than a six-hour span, which has been chosen by way of example only. Furthermore, by providing the indicator 67, the operator, in setting it to whatever the time is when the timing device 60 is being set, which is possible by virtue of the slip clutch 62, will be assured of proper timing operation. The arrangement of FIG. 3 is particularly useful where the actuator 11 is a light sensitive element and the switching apparatus is used for controlling lighting arrangements such as advertising signs where there is no need to have light after a predetermined time. This might also be true of factory parking lots and the like.

In FIG. 4 of the drawings the timing device described in connection with FIG. 3 has been applied to the embodiment of the present invention shown in FIG. 2 of the drawings, which also incorporates the delay means 50, and the corresponding parts of FIG. 4 are designated by the same reference numerals as in the preceding figures of the drawings. In the case of FIG. 4, the cam designated as 63′ differs from the cam 63 only in that it has a recessed operating portion designated as 70 instead of the projecting operating portion of the cam 63. In the case of FIG. 4, the switch 64 controlled by the cam 63′ is connected in parallel with the contacts of the switch 53 included in the time delay means 50 as well as in parallel with the serially arranged actuator 11 and matching resistor 29.

Although the present invention is fuly disclosed in the schematic diagrams described heretofore, the switching apparatus may be embodied in a very small, compact, disposable structure which can be plugged into an electrical circuit by a simple plugging operation. Thus, in FIG. 5 of the drawings there is disclosed an elevational view of one structural embodiment with substantial portions thereof cut away to illustrate how the circuitry and components of FIG. 2 of the drawings can be arranged when used to perform a switching operation in connection with a lighting circuit. The corresponding parts are designated by the same reference numerals as in the preceding embodiments. The physical construction of the switching apparatus of FIG. 5 may be very much the same as that disclosed in the copending Keeran application referred to above. Preferably, the structural unit which has been designated by the reference numeral 72 comprises a base 73 sealed to a tubular housing 74 within which is mounted the actuator 11 which would be a light sensitive element for the particular application. The base 73 supports in an insulating manner the terminals 21, 22 and 23 which may, as illustrated, comprise the three terminals of the conventional twist-lock type of plug-in device. In order that illumination might reach the light sensitive element or actuator 11, the upper part of the housing 74 is enclosed by a transparent or translucent member or window 75, which is illustrated as a cup-shaped member hermetically sealed to the upper end of the tubular member 74 by a sealing arrangement including a resilient O-ring 76. For the purpose of controlling the effectiveness of the window 75 to determine the light level at which the light sensitive element or actuator 11 is rendered effective to actuate the pilot armature 36, there is provided a light level control element or cap 77 in the form of an adjustable cup-shaped cover member which may be selectively adjusted to decrease or increase the amount of light reaching the light sensitive element 11.

To support the various components of the switching apparatus, one or more rods or support members such as 79 extend upwardly from the base 73 within the housing 74. As illustrated, a support 78 is disposed on the upper end of the rod or rods 79. The electromagnetic relay 12 has the winding 25 thereof mounted on the support 78 with the sealed envelope 13 depending through an opening in this support. The bimetallic element 51 and the other elements defining the time delay unit 50 may also be mounted on this support 78 but preferably are mounted as described hereinafter. As illustrated, the light sensitive element or actuator 11 is supported above the winding 25 to be closely adjacent the window 75. A suitable lightning arrester 55 preferably in the form of a simple spark gap may be incorporated in the unit 72 as illustrated. Preferably also, the unit 72 is filled with a resilient insulating compound 80 such as an epoxy resin or the like to give resilient support to the frangible envelope 13 of the electromagnetic switching device 12. This compound may be applied to the assembled components within a paper or cardboard tube 80*a* disposed within the housing 74 prior to applying the housing resulting in the sealed unit. As illustrated the time delay unit 50 and the lightning arrester 55 are supported by the compound 80 within the housing 74. The time delay unit 50 in this case preferably comprises the ceramic resistor with the bimetallic element and switch housed therein discussed above. The compound 80 thus supports envelope 13 and the mercury contained therein and due to its insulating nature properly insulates the electrical elements embedded therein.

Figures 6, 7:
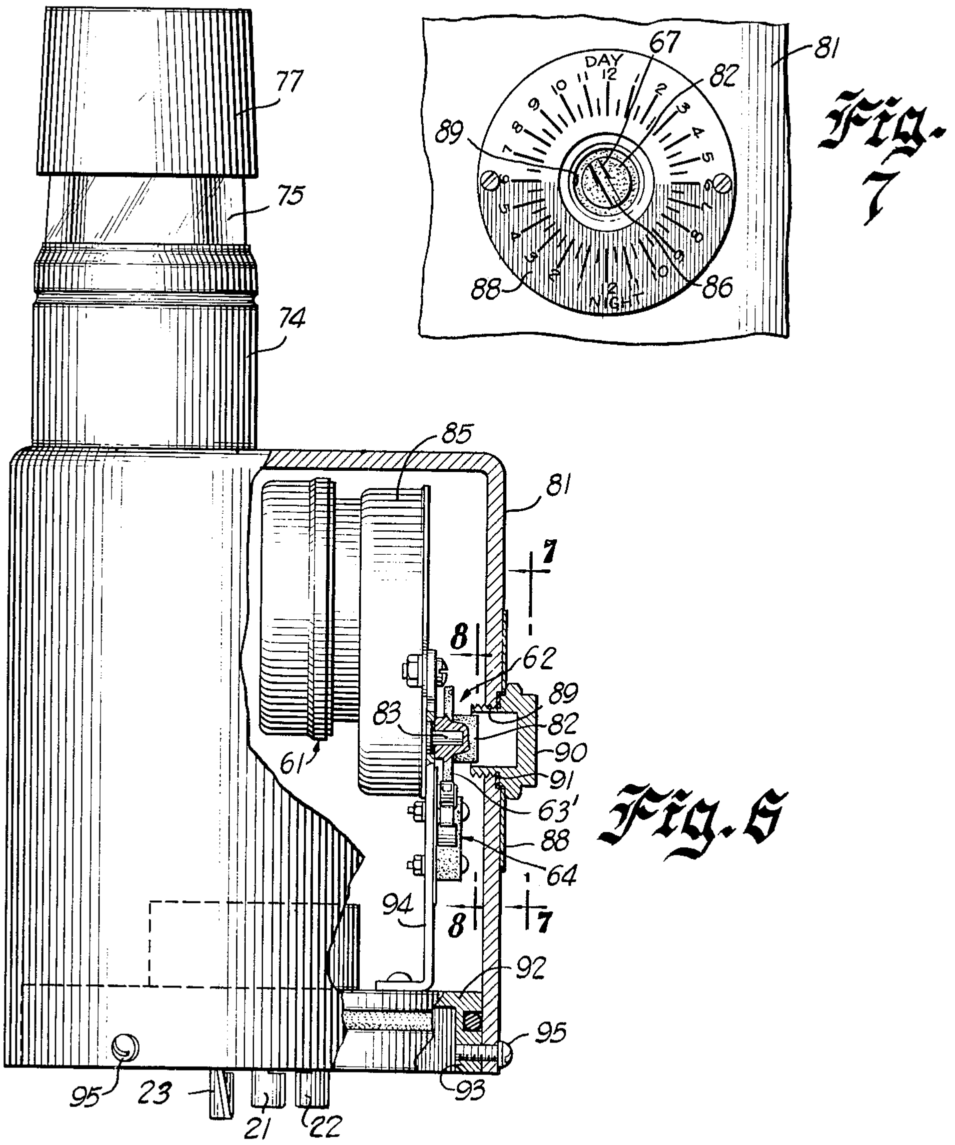
FIG. 6 is an elevational view, partly broken away, of one form of structure which the apparatus of FIG. 4 may take.
FIG. 7 is a view taken along line 7—7 of FIG. 6, assuming the entire device to be shown by FIG. 6.
Figure 8:
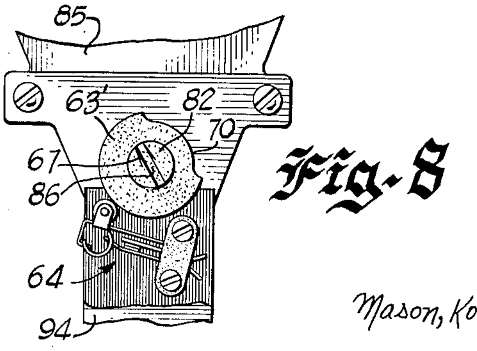
FIG. 8 is a view taken along line 8—8 of FIG. 6, again assuming that FIG. 6 shows the entire structure.

The arrangements shown in FIGS. 3 and 4 of the drawings may similarly be housed in a sealed unit such as shown in FIG. 5 of the drawings. Referring now to FIGS. 6, 7 and 8 of the drawings, there is disclosed an arrangement for housing the switching apparatus of FIG. 4 of the drawings in a sealed replaceable unit. The corresponding parts of FIGS. 6, 7 and 8 are designated by the same reference numerals as in the preceding embodiments. As there illustrated, the housing defined by the tubular member 74 is still a sealed housing and preferably includes an enlarged tubular portion 81 at the lower end thereof which replaces a substantial portion of the tubular member 74, as clearly shown in FIG. 6 of the drawings. The electric clock 61, the slip clutch 62, the cam 63′ and the switch 64 are housed within the enlarged housing portion 81. The slip clutch schematically designated as 62 in FIGS. 3 and 4 of the drawings may be provided by means of a knob 82 having a cylindrical recess therein into which the output shaft 83 of the clock motor 60 is inserted, as clearly indicated in FIG. 6 of the drawings. As best shown in FIGS. 6 and 8 of the drawings, the cam 63′ is constituted by an annular flange on the knob 82. There is sufficient friction between the shaft 83 and the knob 82 for the clock 61 to drive the knob 82 and to actuate the switch 64. However, since the clock 61 comprises the usual reduction gear mechanism generally designated at 85, it cannot be driven from the output shaft 83 and, therefore, rotation of the knob 82 cannot rotate the shaft 83 but, instead, provides relative movement between the cam 63′ and the clock shaft 83. Accordingly, the position of the cam 63′ relative to the switch 64 with respect to the time of day may be adjusted by rotating the knob 82 on the shaft 83, and to facilitate this adjustment the outer face of the knob 82 is provided with a screw driver slot 86. The indicator 67 preferably comprises an arrow on the outer face of the knob 82 and may be located at one end of the slot 86. A dial or twenty-four-hour clock face 88 (FIG. 7 of the drawings), graduated in accordance with the time of day, is mounted on the outer wall of housing portion 81 and surrounds an aperture 89 through which the screw driver is inserted to adjust the cam 63′. Thus, by setting the indicator 67 to the time of day when the setting is being made, proper adjustment of the cam 63′ relative to the switch 64 is automatically accomplished to perform the switching function at the desired time.

In order to seal the clock 61 and associated mechanism included in the housing portions 81 and 74 from the elements and thus to prevent moisture, dust and other foreign matter from entering the same, the aperture 89 is threaded and a sealing plug 90 is threadedly inserted therein over a gasket 91. The housing portion 81 is preferably cylindrical and a disk-like base 92 having a depending annular flange 93 thereon supports the clock 61 and associated mechanism through a bracket 94 and is sealably secured in the lower end of the housing portion 81 by a plurality of screws 95.

While there have been illustrated and described several embodiments of the present invention, it is not desired that the invention be limited to the specific construction shown and described, for it will, of course, be obvious to those skilled in the art that changes and modifications may be made without departing from the invention, and it is, therefore, aimed in the appended claims to cover all those changes and modifications as fall within the true spirit and scope of the present invention.

What is claimed as new and desired to be secured by Letters Patent of the United States is:

1. Switching apparatus comprising, a switch, electromagnetic means for actuating said switch including a stationary magnetic member, a winding and a main armature movable toward said stationary member, an auxiliary armature interposed between said stationary member and said main armature, said auxiliary armature being movable toward said stationary member, first circuit means supplying electrical current of a relatively low magnitude to said winding, and second circuit means for supplying electrical current of a greater magnitude to said winding.

2. The switching apparatus of claim 1 wherein said switch is a mercury switch and said armatures are mounted in a sealed envelope.

3. The switching apparatus of claim 1 wherein said stationary member serves as a stop for said auxiliary armature and means are provided for limiting movement of said auxiliary armature away from said stationary member and for spacing said auxiliary armature from said stationary member.

4. The switching apparatus of claim 1 wherein said main armature includes a tubular portion and said auxiliary armature includes an elongated member receivable in said tubular portion, said elongated member being movable in said tubular portion.

5. The switching apparatus of claim 1 wherein a magnetic field of sufficient strength to move said auxiliary armature to a picked up position adjacent and in electrical communication with said stationary member is created when a current is supplied through said first circuit means and a magnetic field of sufficient strength to move said main armature to a position adjacent said picked up auxiliary armature is created when current is supplied through said second circuit means.

6. The switching apparatus of claim 5 wherein movement of said auxiliary armature to said picked up position completes an electric circuit through said auxiliary armature, and time delay means responsive to completion of said electric circuit through said auxiliary armature for completing said second circuit means.

7. The switching apparatus of claim 6 comprising third circuit means connected in parallel with said first circuit means including timing means, said third circuit means supplying electric current to said winding of the same magnitude as said second circuit means.

8. The switching apparatus of claim 5 wherein a magnetic field of sufficient strength to hold said main armature in said position adjacent said picked up auxiliary armature is created when current is supplied through said first circuit means.

9. The switching apparatus of claim 8 wherein movement of said auxiliary armature to said picked up position adjacent and in electrical communication with said stationary member completes said second circuit means thereby supplying current of said greater magnitude to said winding.

10. The switching apparatus of claim 9 wherein movement of said main armature to said position adjacent said picked up auxiliary armature interrupts said second circuit means.

11. The switching apparatus of claim 1 wherein said switch and electromagnetic means are mounted within a housing, an actuator in said housing responsive to a low level electrical characteristic connected in said first circuit means, and timer means supported within said housing for rendering said actuator ineffective during a predetermined period.

12. The apparatus of claim 11 wherein said timer means comprises a continuously driven clock and cam, and wherein means are connected to said cam and accessible from the exterior of said housing to permit relative adjustment between said cam and said clock from the outside of said housing.

13. The apparatus of claim 11 wherein said timer means comprises a clock motor, a switch actuating cam, a slip clutch interconnected between said motor and said cam, and means connected to said cam and accessible from the exterior of said housing to permit relative adjustment between said cam and said motor from the outside of said housing.

14. The switching apparatus of claim 11 wherein said timer means comprises a switch actuated cam, a clock and a slip clutch interconnecting the output shaft of said clock to said cam to permit adjustment of said cam relative to said shaft.

15. Apparatus as set forth in claim 14 wherein said housing is provided with an aperture in the vicinity of said cam and a time graduated dial is provided on the outer surface of said housing surrounding said aperture, and indicating means on said cam cooperating with said dial for determining the setting of said cam.

16. Switching apparatus comprising, a switch, electromagnetic means for actuating said switch including a stationary magnetic member, a winding and a main armature movable toward said stationary member, an auxiliary armature interposed between said stationary member and said main armature, said auxiliary armature being movable toward said stationary member, cooperating means on said armatures electrically interconnecting said auxiliary armature and said main armature, first circuit means independent of said cooperating means for supplying electrical current of a relatively low magnitude to said winding, and second circuit means including said cooperating means for supplying electrical current of a greater magnitude to said winding.

17. Switching apparatus comprising, an electromagnet including a stationary magnetic member, a winding and a movable main armature movable toward said magnetic member when a current of a first predetermined value flows through said winding, a switch controlled by said main armature, an auxiliary armature disposed between said magnetic member and said main armature, said auxiliary armature being movable against said stationary magnetic member when a current of a second predetermined value flows through said winding, said second predetermined current value being less than said first predetermined current value and insufficient to cause movement of said main armature, means for completing an electric circuit through said magnetic member and both said armatures when said auxiliary armature engages said stationary magnetic member, and means responsive to completion of said electric circuit for increasing the energization of said winding to said first predetermined value to move said main armature and actuate said switch.

18. The switching apparatus of claim 17 wherein said last mentioned means comprises a time delay switching means.

19. Light responsive switching apparatus comprising, an electromagnet including a stationary magnetic member, a winding and a movable main armature movable toward said magnetic member when a current of a first predetermined magnitude flows through said winding, a switch controlled by said main armature, a light sensitive element connected in series with said winding across a source of potential, an auxiliary armature disposed between said magnetic member and said main armature, said auxiliary armature being movable against said stationary magnetic member when a current of a second predetermined magnitude less than said first predetermined magnitude flows through said winding and said light sensitive element, said second predetermined magnitude being insufficient to cause movement of said main armature, means for completing an electric circuit through said magnetic member and both said armatures when said auxiliary armature engages said stationary magnetic member, and means responsive to completion of said electric circuit for supplying a current of at least said first predetermined magnitude through said winding to move said main armature and actuate said switch.

20. The light responsive switching apparatus of claim 19 wherein said last mentioned means comprises a time delay switching means for paralleling said light sensitive element.

21. Light responsive switching apparatus comprising, an electromagnet including a stationary magnetic member, a winding and a movable hollow main armature movable toward said magnetic member when a current of a first predetermined magnitude flows through said winding, a switch controlled by said main armature, a light sensitive element connected in series with said winding, means for connecting the series circuit comprising said light sensitive element and said winding to a source of potential, an auxiliary armature disposed between said magnetic member and said main armature, said auxiliary armature having an elongated portion of nonmagnetic but electrically conductive material extending into said hollow main armature and being movable against said stationary magnetic member when a current of a second predetermined magnitude less than said first predetermined magnitude flows through said winding and said light sensitive element, said second predetermined magnitude being insufficient to cause movement of said main armature, means including said elongated portions for completing an electric circuit through said magnetic member and both said armatures when said auxiliary armature engages said stationary magnetic member, and thermal switch means responsive to completion of said electric circuit for supplying a current of at least said first predetermined magnitude to said winding to move said main armature and actuate said switch.

22. The light responsive switching apparatus of claim 21 comprising a sealed housing for said electromagnet, light sensitive element, and thermal switch.

23. The light responsive switching apparatus of claim 22 wherein said sealed housing includes a paper liner filled with a resilient compound for supporting the elements of said switching apparatus within said housing.

24. Switching apparatus comprising, a switch, electromagnetic means for actuating said switch including a stationary member, a winding and a main armature movable toward said stationary member, an auxiliary armature interposed between said stationary member and said main armature, said auxiliary armature being movable toward said stationary member, cooperating means on said armatures electrically interconnecting said auxiliary armature and said main armature, first circuit means independent of said cooperating means for supplying electrical current of a relatively low magnitude to said winding, and second circuit means including said cooperating means for supplying electrical current of a greater magnitude to said winding.

25. Switching apparatus comprising, an electromagnet including a stationary member, a winding and a movable main armature movable toward said member when a current of a first predetermined value flows through said winding, a switch controlled by said main armature, an auxiliary armature disposed between said member and said main armature, said auxiliary armature being movable against said stationary member when a current of a second predetermined value flows through said winding, said second predetermined current value being less than said first predetermined current value and insufficient to cause movement of said main armature, means for completing an electric circuit through said member and both said armatures when said auxiliary armature engages said member, and means responsive to completion of said electric circuit for increasing the energization of said winding to said first predetermined value to move said main armature and actuate said switch.

References Cited in the file of this patent

UNITED STATES PATENTS

| | | |
|---|---|---|
| 2,042,109 | Lamb | May 26, 1936 |
| 2,057,384 | Lamb | Oct. 13, 1936 |
| 2,211,701 | McGrath | Aug. 13, 1940 |
| 2,331,475 | Johnson | Oct. 12, 1943 |
| 2,697,803 | Eadie | Dec. 21, 1954 |
| 2,753,492 | Jay | July 3, 1956 |
| 2,755,392 | Garnick | July 17, 1956 |
| 2,898,525 | Jacobs | Aug. 4, 1959 |
| 2,900,520 | Frank | Aug. 18, 1959 |